(12) United States Patent
Alefelder et al.

(10) Patent No.: US 9,647,435 B2
(45) Date of Patent: May 9, 2017

(54) BUSBAR SYSTEM ESPECIALLY FOR LONG VERTICAL PATHS

(71) Applicants: Frank Alefelder, Neunkirchen-Seelscheid (DE); Rainer Haar, Bonn (DE)

(72) Inventors: Frank Alefelder, Neunkirchen-Seelscheid (DE); Rainer Haar, Bonn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 201 days.

(21) Appl. No.: 14/376,906

(22) PCT Filed: Feb. 1, 2013

(86) PCT No.: PCT/EP2013/051990
§ 371 (c)(1),
(2) Date: Aug. 6, 2014

(87) PCT Pub. No.: WO2013/120703
PCT Pub. Date: Aug. 22, 2013

(65) Prior Publication Data
US 2015/0303670 A1    Oct. 22, 2015

(30) Foreign Application Priority Data
Feb. 17, 2012    (DE) .......... 10 2012 202 435

(51) Int. Cl.
*H02G 5/00*    (2006.01)
*H02G 5/06*    (2006.01)
(Continued)

(52) U.S. Cl.
CPC .............. *H02G 5/06* (2013.01); *H02G 5/025* (2013.01); *H02G 3/0493* (2013.01)

(58) Field of Classification Search
CPC ......... H02G 3/0493; H02G 5/025; H02G 5/06
(Continued)

(56) References Cited

U.S. PATENT DOCUMENTS 4,285,793 A * 8/1981 Specht .................. C25B 9/045
                                                204/253
4,845,589 A * 7/1989 Weidler ............... H01R 25/162
                                                200/51 R
(Continued)

FOREIGN PATENT DOCUMENTS

CN    1575379 A    2/2005
CN    1745247 A    3/2006
(Continued)

OTHER PUBLICATIONS

International Search Report PCT/ISA/210 for PCT/EP2013/051990 dated Jun. 10, 2013.
(Continued)

*Primary Examiner* — Timothy Thompson
*Assistant Examiner* — Rhadames J Alonzo Miller
(74) *Attorney, Agent, or Firm* — Harness, Dickey & Pierce, PLC

(57) ABSTRACT

A busbar system for the transport of energy especially for long vertical paths is disclosed, wherein the busbar system includes multiple sections, the sections each include multiple busbars and a holding piece, and the busbars of the sections are held by the respective holding pieces and electrically connected to one another via a connection.

10 Claims, 4 Drawing Sheets

(51) Int. Cl.
*H02G 5/02* (2006.01)
*H02G 3/04* (2006.01)

(58) Field of Classification Search
USPC ........................................................ 174/70 B
See application file for complete search history.

(56) References Cited

U.S. PATENT DOCUMENTS

| | | | | |
|---|---|---|---|---|
| 5,785,542 | A * | 7/1998 | Johnson | H01R 25/162 439/210 |
| 7,704,083 | B1 * | 4/2010 | Cheyne | H01R 4/38 439/115 |
| 8,512,057 | B2 | 8/2013 | Haar et al. | |
| 2005/0042099 | A1 | 2/2005 | Wobben | |
| 2006/0233645 | A1 * | 10/2006 | Wobben | F03D 80/00 416/132 B |
| 2011/0221205 | A1 * | 9/2011 | Haar | H02G 3/0493 290/55 |

FOREIGN PATENT DOCUMENTS

| | | |
|---|---|---|
| CN | 102217156 A | 10/2011 |
| DE | 10 2008 058 129 A1 | 5/2010 |
| DE | 10-2010-027-498 | 7/2010 |
| DE | 10 2009 032 619 A1 | 1/2011 |
| JP | H0828534 A | 2/1996 |
| KR | 20040045862 A | 6/2004 |
| KR | 20090081903 A | 7/2009 |
| WO | WO-03/036084 A1 | 5/2003 |
| WO | WO-2005/104320 A1 | 11/2005 |

OTHER PUBLICATIONS

Written Opinion PCT/ISA/237 for PCT/EP2013/051990 dated Jun. 10, 2013.
Australian Office Action dated Mar. 18, 2016.
Korean Office Action and English translation thereof dated Aug. 20, 2015.
Chinese Office Action dated Jul. 5, 2016 issued in corresponding Chinese Application No. 201210155280.4 (with translation).
European Office Action issued in corresponding European Application No. 13704043.2-1801.

* cited by examiner

FIG 1A
FIG 1B
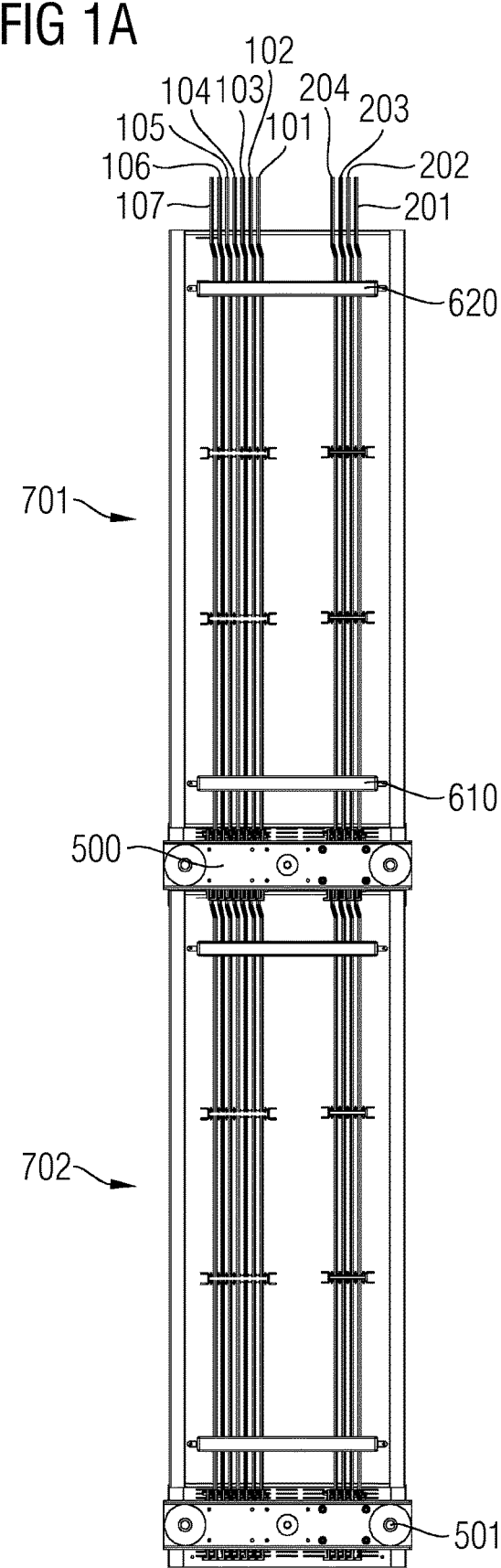
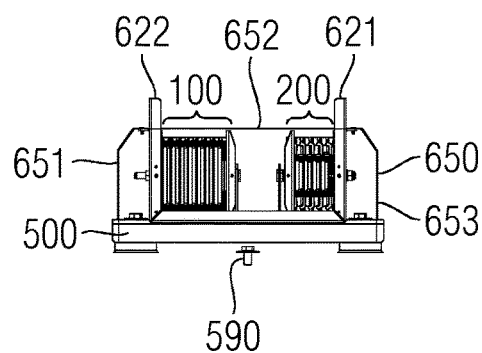

BUSBAR SYSTEM ESPECIALLY FOR LONG VERTICAL PATHS

PRIORITY STATEMENT

This application is the national phase under 35 U.S.C. §371 of PCT International Application No. PCT/EP2013/051990 which has an International filing date of Feb. 1, 2013, which designated the United States of America, and which claims priority to German patent application number DE 10 2012 202 435.2 filed Feb. 17, 2012, the entire contents of each of which are hereby incorporated herein by reference.

FIELD

At least one embodiment of the invention relates generally to busbar systems.

BACKGROUND

Electrical distribution systems can be embodied as busbar systems. Busbar systems are used to transport and distribute electrical energy. Typical tasks of a busbar system are, for example, to connect a transformer to a subsidiary distribution box via a main distribution box or to supply large consumers. Busbar systems are also used in wind power plants to conduct the current of a generator generated in the tower head to the tower base. The busbars of a busbar system are typically housed in a busbar enclosure which prevents unwanted electrical contact between busbars and the environment. In this case, the busbar enclosure is dimensioned such that, on the one hand, the distances required to prevent unwanted electrical contact are guaranteed and, on the other, the busbars inside the busbar enclosure are cooled by natural or forced convection.

The housings of previous busbar systems form a functional unit with the busbars which results in restrictions with respect to the dimensions of the busbar elements and in the ventilation of the system. Especially during the transportation of energy over long, vertical paths, for example in high-rise buildings or wind power plants, restricted ventilation or convection inside the busbar enclosures results in the accumulation of heat in the upper region of the installed busbar systems.

SUMMARY

At least one embodiment of the invention provides a busbar system with which the housing of the busbar system is functionally separate from the current-carrying elements.

The busbar system for the transport electrical energy of at least one embodiment comprises at least a first section and a second section, wherein the sections each comprise at least a first busbar with a first cross-sectional area and a holding piece, wherein the busbars of the respective sections are held by the respective holding pieces and electrically connected to one another via a connection.

BRIEF DESCRIPTION OF THE DRAWINGS

Features of the present invention can be more clearly understood from the following detailed description of example embodiments described with reference to the following figures.

FIG. 1A a busbar system comprising a first section and a second section depicted in a first projection, FIG. 1B a section of a busbar system with first busbars and second busbars depicted in a second projection, FIG. 2A a busbar system comprising a first section and a second section with a covering, FIG. 2B detailed view of a holding piece with a first and a second bolt connection, FIG. 3 busbar system comprising a first and a second section, depicted in a third projection and FIG. 4 an adapter for a busbar system.

DETAILED DESCRIPTION OF EXAMPLE EMBODIMENTS

Figure 2A:
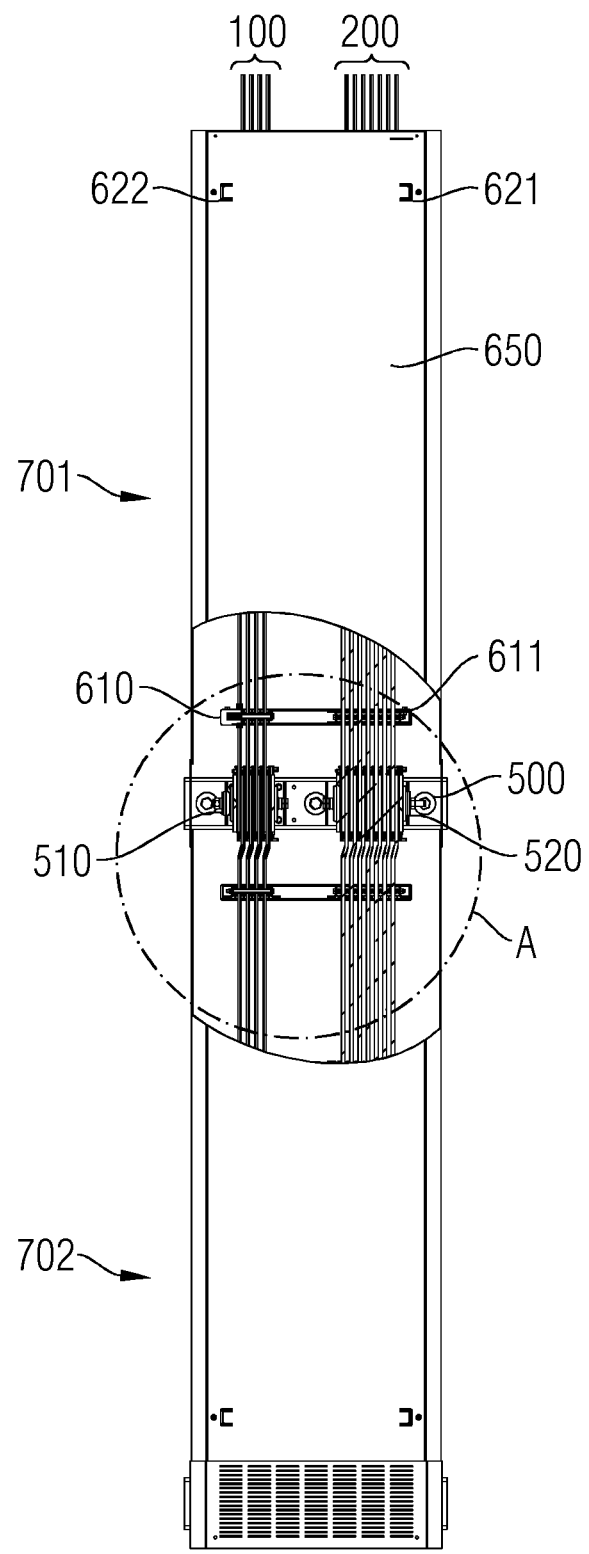

The busbar system for the transport electrical energy of at least one embodiment comprises at least a first section and a second section, wherein the sections each comprise at least a first busbar with a first cross-sectional area and a holding piece, wherein the busbars of the respective sections are held by the respective holding pieces and electrically connected to one another via a connection.

Here, it is advantageous for the busbars to be flexible with respect to their size since their dimensions are not limited by a system housing. It is also possible to achieve better thermal conditions in the housing by increasing the distances between busbars and a potential housing. This effect improves the heat dissipation and increases the current-carrying capacity of the busbars.

In one embodiment, the sections each comprise a first busbar, which extends longitudinally in the direction of the current flow.

In a further embodiment, the sections comprise multiple first busbars, which are arranged parallel to one another in the respective section.

In a further embodiment, the holding pieces comprise a first bolt connection, wherein the first busbars of the respective sections are electrically connected to one another in that the ends of the first busbars lie flat against one another and the first bolt connection exerts a force that presses the ends lying flat against one another of the first busbars against one another. The connection of the first busbars of the respective sections by way of a bolt connection enables the respective sections to be electrically connected to one another in a particularly simple way.

In a further embodiment, the holding pieces of the sections are used as holding device for fastening the busbar system. Here, it is advantageous that the dual function of the holding pieces as holdings for the first busbars and as holding device for fastening the busbar system enables savings to be made on material and components.

In a further embodiment, the individual sections of the busbar system also comprise at least a second busbar with a second cross-sectional area. The first cross-sectional area of the first busbars can differ from the second cross-sectional area of the second busbars. Here, it is advantageous that a holding piece jointly carries busbars with first cross-sectional areas and second cross-sectional areas. This also achieves a saving on material and components.

The sections of the busbar system can comprise multiple second bars which are arranged in parallel to one another in the respective section. It is also possible for the first busbars and the second busbars to extend in parallel to one another in a section.

In a further embodiment of the invention, the holding pieces comprise a second bolt connection, wherein the second busbars of the respective sections are electrically connected to one another in that the ends of the second busbars lie flat against one another and the second bolt connection exerts a force that presses the ends lying flat against one another of the second busbars against one another. Here it is advantageous that the second busbars can be electrically connected to one another particularly easily by way of the second bolt connection.

In a further embodiment, the first busbars and the second busbars of the respective sections are each connected by a single bolt connection.

In a further embodiment, holders to which a covering is fastened are attached to the busbars of the respective sections. Hence, the housing or the busbar enclosure is attached to the actual busbars with the fewest possible components.

In a further embodiment of the invention, the covering is only attached to the sides of the sections facing away from the fastening of the busbar system.

In a further embodiment of the invention, the busbar system with first busbars and second busbars also comprises an adapter, which is able to connect the first busbars to a first external busbar system and the second busbars to a second external busbar system. The adapter can be embodied to connect first and second busbars extending in parallel to one another at right angles to the busbars of the first and second external busbar systems.

FIG. 1A shows a busbar system for the transport of electrical energy depicted in a first projection of the top view of the busbar system. The busbar system comprises a first section 701 and a second section 702. The sections 701, 702 each comprise first busbars 101, 102, 103, 104 with a first cross-sectional area and a holding piece 500, 501, wherein the busbars of the respective sections 701, 702 are held by the respective holding pieces 500, 501 and electrically connected to one another via a connection 510, 520. According to FIG. 1A, the holding piece 500 is assigned to the first section 701 and the holding piece 501 to the second section 702. The connection 510, 520 connects the respective first busbars 101, 102, 103, 104 of the first and second sections.

The busbars of the busbar system according to an embodiment of the invention extend longitudinally in the direction of the current flow. According to the depiction in FIG. 1A, this means that the current flow is vertical and hence the busbars extend vertically. The individual first busbars 101, 102, 103, 104 of the respective sections 701, 702 are arranged parallel to one another.

FIG. 1B shows the busbar system according to an embodiment of the invention, depicted in a second projection. Unlike the case in FIG. 1A, the depiction in FIG. 1B is selected perpendicular to the current flow. The holding piece 500 holds the first busbars 100 and also comprises a fastening device 590, which serves as a holding device for fastening the busbar system. The fastening device 590 can, for example, be embodied as a screw so that the sections can be fastened by way of the screws 590 for example to a wall or to a support.

FIG. 1A also shows holders 610, 620 on the section 701, which are attached directly to the busbars. A covering 650, as depicted in FIG. 2A, can be fixed to the holders 610, 620. The holders 610, 620 can comprise arms 621, 622 embodied perpendicular to the routing direction of the busbars which carry the covering 650. Here, the arms 621, 622 of the holders 610, 620 can protrude through openings in the covering 650 and thereby fix them. To prevent the covering 650 from coming loose, when the covering 650 has been placed on the busbar system, they can be fixed by way of screws, rivets or another fastening device.

Figure 2B:
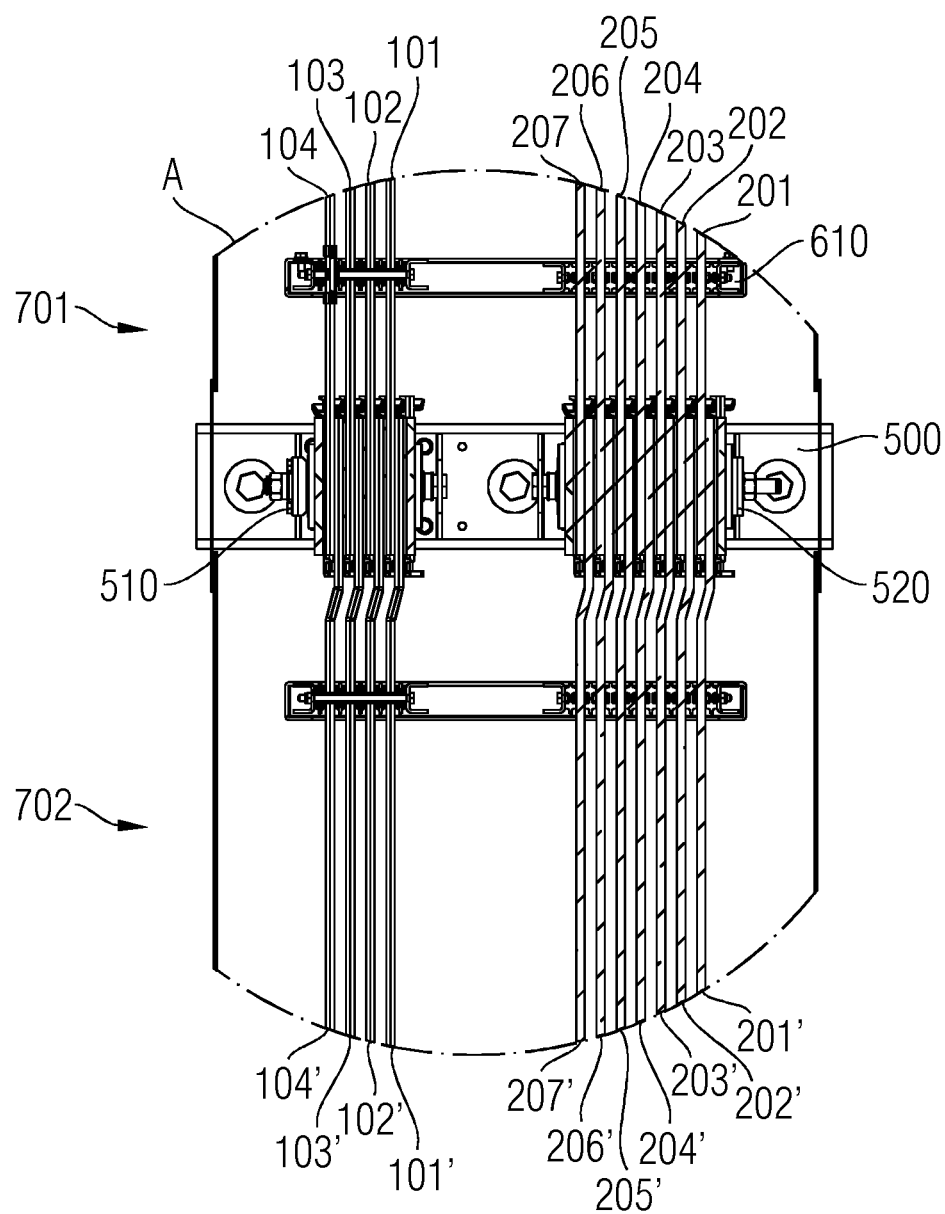

FIG. 2B depicts the holding piece 500 in more detail. The holding piece 500 connects the first section 701 to the second section 702. The first section 701 comprises first busbars 101, 102, 103, 104. The second section 702 comprises first busbars 101', 102', 103', 104'. The first busbars of the sections 701, 702 are electrically connected to one another in that the ends of the first busbars lie flat against one another and a first bolt connection 510 exerts a force that presses the ends of the first busbars lying flat against one another against one another. The ends of the first busbars of the respective sections 701, 702 can be hook-shaped on one side and provided with a perforation on the other side through which the bolt connection of the holding piece 500, 501 extends. This choice of the design of the ends of the first busbars facilitates particularly simple assembly of the sections 701, 702. Following the assembly of the holding pieces 500, 501, the hook can be swung into the bolt connection and the bolt connection tightened.

The first section 701 also comprises second busbars 201, 202, 203, 204, 205, 206, 207 with a second cross-sectional area, which can differ from the first cross-sectional area of the first busbars 101, 102, 103, 104. The different cross-sectional areas of the first busbars 100 and second busbars 200 are depicted in FIG. 1B. The second busbars also extend parallel to one another in the respective sections 701, 702. According to FIGS. 1A, 2A and 2B, the first busbars 101, 102, 103, 104 and the second busbars 201, 202, 203, 204, 205, 206, 207 extend in parallel to one another.

According to FIG. 2B, the holding piece 500 comprises a second bolt connection 520. This second bolt connection 520 is used to connect the second busbars 201, 202, 203, 204, 205, 206, 207 of the first section 701 to the second busbars 201', 202', 203', 204', 205', 206', 207' of the second section 702 electrically to one another in that the ends of the second busbars lie flat against one another and the second bolt connection 520 exerts a force that presses the ends of the second busbars lying flat against one another against one another.

According to the example embodiment shown here, the holding pieces 500, 501 comprise the connections 510, 520. However, it is also conceivable for the connections 510, 520 that connect the respective busbars of the sections 701, 702 electrically to one another to be embodied separate from the holding pieces 500, 501. Hence, the holding pieces 500, 501 can, for example, be spatially arranged in the center of the busbars while the connections 510, 520 are located on the ends of the busbars.

Figure 3:
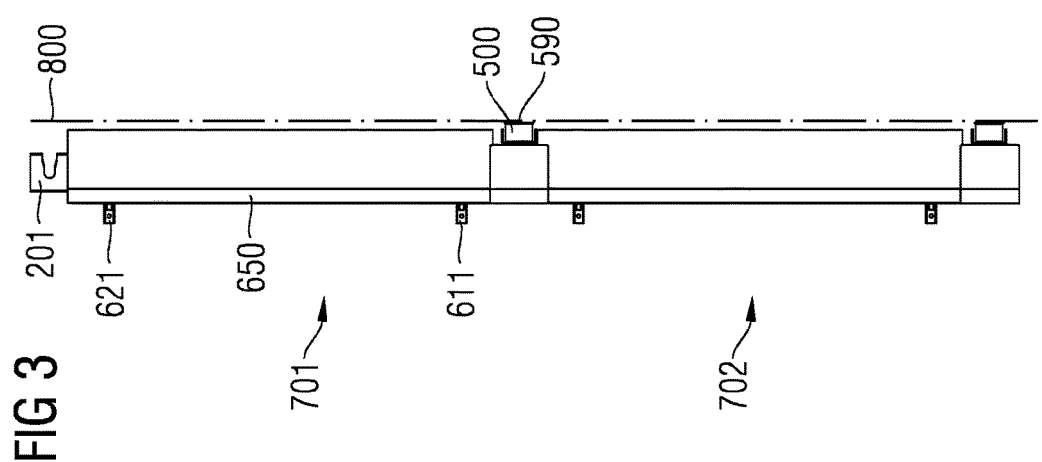

FIG. 3 depicts the busbar system according to an embodiment of the invention in a third projection. The depiction according to FIG. 1A has been perspectively rotated by 90° to provide a side view of the busbar system. The busbar system comprises the first section 701 and the second section 702. The busbars of the sections are electrically connected to one another via the connection 510, 520 of the holding piece 500. The holding piece 500 comprises a holding device 590 for fastening the busbar system. For example, the holding device 590 can be used to screw the busbar system to a wall 800. The busbar system comprises holders 610, 620 with arms 611, 621 onto which a covering 650 can be pushed and fixed.

The covering 650 can be embodied such that it is only attached to the sides of the sections 701, 702 facing away from the fastening of the busbar system. According to FIG. 3, this means that the covering is not located on the lower side facing the wall 800 but only to the side of the busbars and extends above the busbars parallel to the wall 800. According to FIG. 1B, this means that the covering 650 consists of three sections, sections 653 and 651, which extend approximately in parallel to the busbars 100, 200, and section 652, which extends approximately parallel to a wall 800.

The first busbars 100 and second busbars 200 of the respective sections 701, 702 can also be connected to one another by a single bolt connection.

Figure 4:
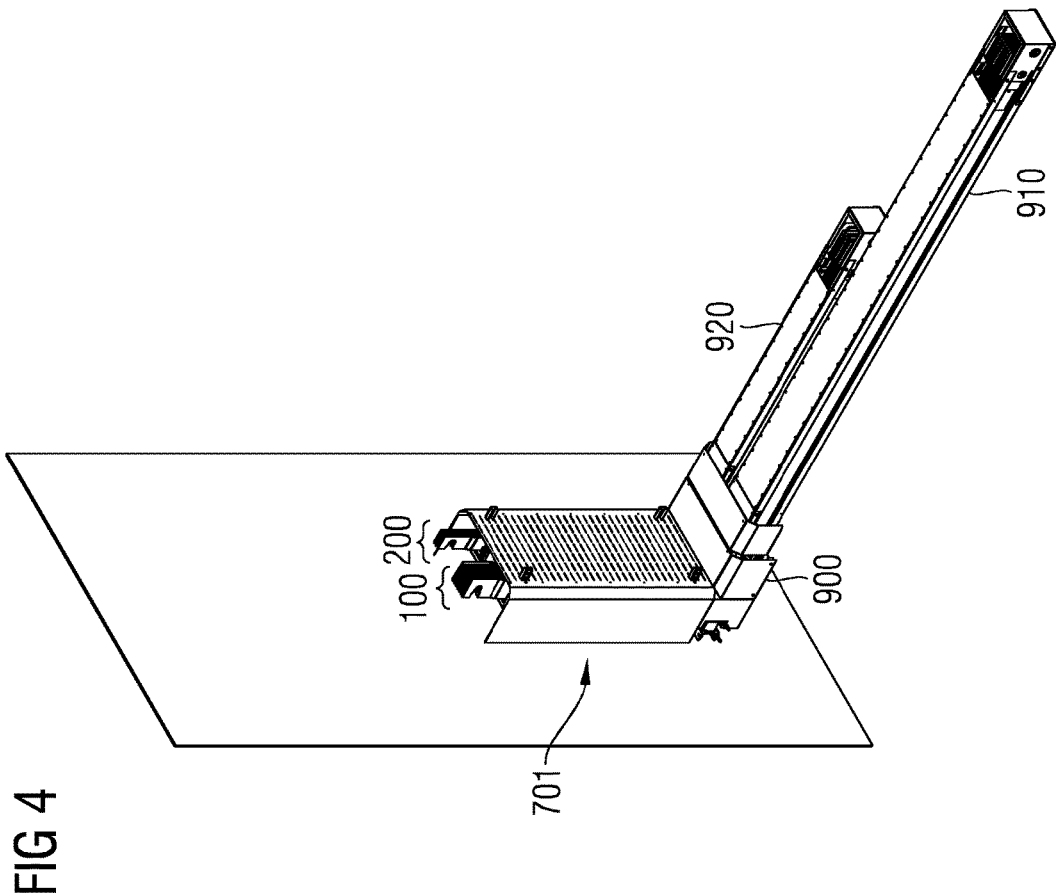

FIG. 4 depicts an adapter 900 connecting the busbar system according to an embodiment of the invention to conventional busbar systems. The busbar system according to the invention comprises first busbars 100 and second busbars 200 both of which are electrically connected to the adapter 900. Once again, bolt connections can be used as the connection. The adapter 900 also comprises connectors for a first, external busbar system 910. The number of busbars in the first, external busbar system 910 is the same as the number of first busbars of the busbar system according to the invention with the same cross-sectional areas. The adapter 900 also connects the second busbars of the busbar system according to an embodiment of the invention to a second, external busbar system 920. The second, external busbar system 920 is a busbar system with the same number of busbars as the number of second busbars of the busbar system according to an embodiment of the invention. The cross-sectional areas of the second busbars of the busbar system according to an embodiment of the invention and the busbars of the second, external busbar system are also identical.

The adapter 900 can be embodied such that it enables a rectangular connection between the busbar system according to an embodiment of the invention and the first and second external busbar systems.

The fact that, in the busbar system according to an embodiment of the invention, the covering 650 and the busbars are no longer considered to be a unit but are seen as separate elements results inter alia in the following advantages. The size of the busbars is flexibly adjustable because their dimensions are no longer limited by a system housing. The number of busbars and the cross-sectional area of the busbars are also variable and can be matched to the individual application. For example, a busbar system with four first busbars and seven second busbars can be accommodated in a housing. Enlarging the distances between the busbars and the covering can achieve better thermal conditions in the covering (stack effect). This effect improves the heat dissipation and the current-carrying capacity of the busbars is increased. Combining multiple busbars with different cross-sectional areas under one covering achieves a further cost advantage.

The invention claimed is:

1. A busbar system for the transport of electrical energy, comprising:
   at least a first section and a second section, the sections each including
   multiple first busbars, arranged in parallel to one another in first respective sections, and multiple second busbars, arranged in parallel to one another in second respective sections, a first cross-sectional area of the first busbars being different from a second cross-sectional area of the second busbars;
   holding pieces, each comprising a first bolt connection;
   wherein the first busbars of the respective sections are electrically connected with ends of the first busbars lying flat against one another;
   wherein the holding pieces comprise a second bolt connection;
   wherein the second busbars of second respective sections are electrically connected with ends of the second busbars lying flat against one another; and
   wherein the holding pieces of the first and second respective sections serve as a holding device for fastening the multiple first busbars together and the multiple second busbars together.

2. The busbar system of claim 1, wherein the first busbar of each of the sections extends longitudinally in a direction of current flow.

3. The busbar system of claim 1, wherein the first bolt connection is configured to exert a force that presses the ends of the first busbars, lying flat against one another, against one another.

4. The busbar system of claim 3, wherein the second bolt connection is configured to exert a force which presses the ends of the second busbars, lying flat against one another, against one another, against one another.

5. The busbar system of claim 4, wherein the first busbars and the second busbars of the respective sections are each connected via a single bolt connection.

6. The busbar system of claim 1, wherein holders are attached to the busbars of the respective sections to which a covering is fastened.

7. The busbar system of claim 6, wherein the covering is only attached to sides of the sections facing away from fastening of the busbar system.

8. The busbar system of claim 1, wherein the multiple first busbars include first busbars and other busbars, the busbar system further comprising:
   an adapter, configured to connect the first busbars to a first, external busbar system and configured to connect the other busbars to a second, external busbar system.

9. The busbar system of claim 8, wherein the adapter connects first and other busbars extending in parallel to one another at right angles to busbars of the first and second external busbar systems.

10. A busbar system for the transport of electrical energy, comprising:
    at least a first section and a second section, the sections each including
    multiple first busbars, arranged in parallel to one another in first respective sections, and multiple second busbars, arranged in parallel to one another in second respective sections, a first cross-sectional area of the first busbars being different from a second cross-sectional area of the second busbars;
    holding pieces, each comprising a first bolt connection;
    wherein the first busbars of the respective sections are electrically connected with ends of the first busbars lying flat against one another
    wherein the first bolt connection is configured to exert a force that presses the ends of the first busbars, lying flat against one another;
    wherein the holding pieces comprise a second bolt connection;
    wherein the second busbars of second respective sections are electrically connected with ends of the second busbars lying flat against one another;
    wherein the second bolt connection is configured to exert a force which presses the ends of the second busbars, lying flat against one another;
    wherein the holding pieces of the first and second respective sections serve as a holding device for fastening the busbar system, and
    holders attached to the busbars of the respective sections to which a covering is fastened, wherein the covering is only attached to sides of the sections facing away from fastening of the busbar system.

* * * * *